Aug. 22, 1939.  H. V. RAU  2,170,216
SNAP FASTENER
Filed Feb. 26, 1938  3 Sheets-Sheet 1

INVENTOR.
Henry V. Rau
BY
Ramsey, Kent, Chisholm & Lutz
his ATTORNEYS

Aug. 22, 1939.                    H. V. RAU                      2,170,216
                                SNAP FASTENER
                         Filed Feb. 26, 1938           3 Sheets-Sheet 2

INVENTOR.
Henry V. Rau
BY Ramsay, Kent, Chisholm & Lutz
his ATTORNEYS

Aug. 22, 1939.    H. V. RAU    2,170,216
SNAP FASTENER
Filed Feb. 26, 1938    3 Sheets-Sheet 3

INVENTOR.
Henry V. Rau
BY
his ATTORNEYS

Patented Aug. 22, 1939

2,170,216

UNITED STATES PATENT OFFICE 2,170,216

SNAP FASTENER

Henry V. Rau, Amityville, N. Y., assignor to Edwin B. Stimpson Company, Brooklyn, N. Y., a corporation of New York Application February 26, 1938, Serial No. 192,729

2 Claims. (Cl. 24—217)

The present invention relates broadly to fastening devices and more especially to snap fasteners.

The principal object of the present invention is to produce a thin snap fastener which may be substituted for other fastening means, such as buttons or the like, without substantially increasing the bulk or thickness of parts where the snap fastener is used.

The common form of snap fastener is one wherein an upstanding post is received in a suitable open clamp socket, and such fasteners are considerably more bulky than a thin button. The present fastener comprises a relatively flat disc member adapted to be received within a relatively low flat socket member and wherein the disc and socket member are substantially larger in diameter, but are less in thickness than the ordinary post and socket type of fastener.

Other and further objects of the present invention will in part be obvious and will in part be pointed out hereinafter in the specification following by reference to the accompanying drawings, in which like parts are indicated by like characters throughout the several figures thereof.

Figure 1:
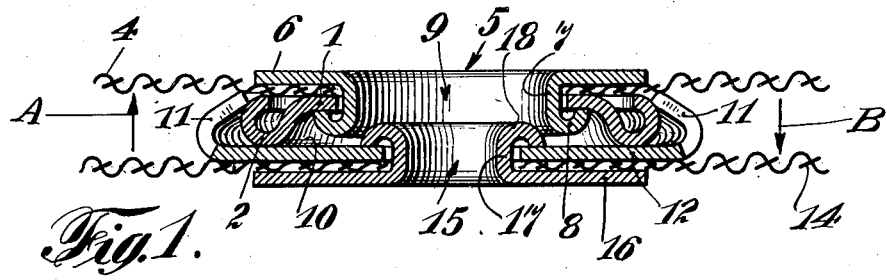
Fig. 1 is a sectional view taken on line 1—1 of Figs. 2 and 3 with the parts in interlocked relation.
Figure 2:
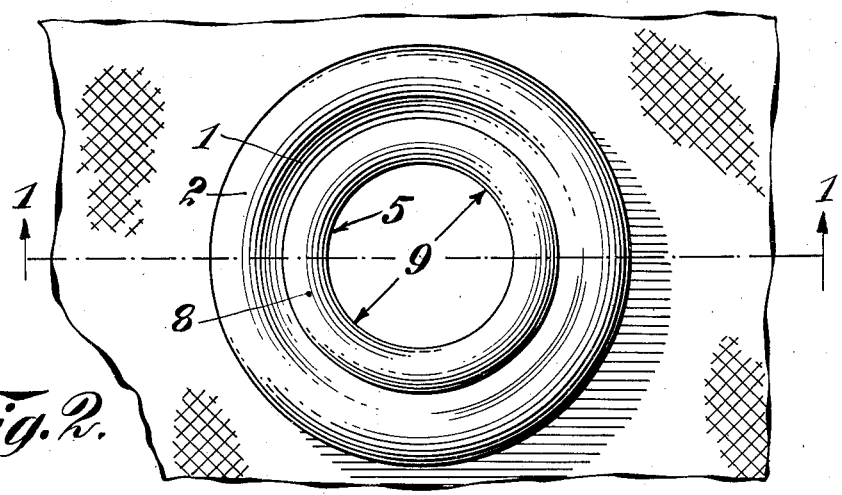
Fig. 2 is a plan view of the disc member looking in the direction of the arrow A (Fig. 1).
Figure 3:
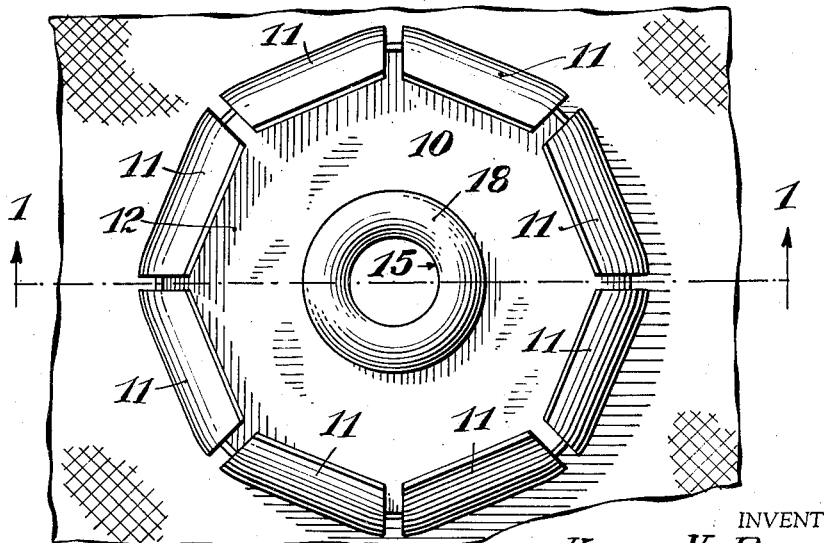
Fig. 3 is a plan view of the socket member looking in the direction of the arrow B, Fig. 1.
Figure 4:
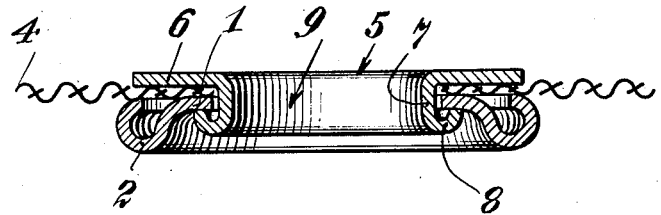
Fig. 4 is a sectional view through the disc member as shown in Fig. 1 and comprises a section on line 1—1 of Fig. 2.
Figure 5:
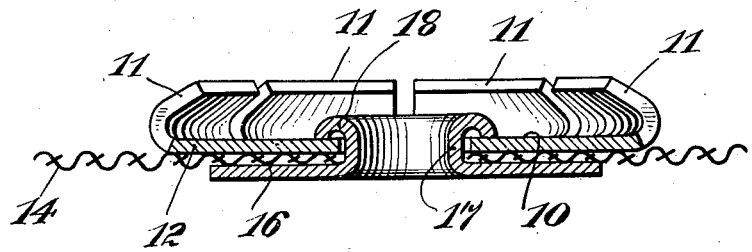
Fig. 5 is a section of the socket member similar to that shown in Fig. 1 and is a section on line 1—1 of Fig. 3.

Referring now more especially to Figs. 1 to 5, inclusive, a disc member 1 is provided with a rolled edge 2 and is secured to material 4, which may comprise textile material, leather, or other flexible sheet material to which the fastener is to be attached. Preferably, the securing means for the disc member 1 comprises a hollow stem rivet 5 having a flat head 6 and a hollow stem 7 that terminates in a rolled over end 8 which clamps the disc 1 tightly against the material 4. It will be observed that the opening 9 in the hollow rivet 5 is of substantial size for a purpose hereinafter explained.

The socket member 10 is also disc-like in cupped form and is provided with upstanding spring fingers 11 that are inwardly inclined from a back plate 12. The internal diameter between the opposing ends of these spring fingers 11, as measured across the center of the back plate, is slightly less than the diameter of the disc member 1, as measured across the largest periphery of the rolled edge 2. Also the distance from the ends of the spring fingers 11 to the back plate 12 is slightly greater than the distance from the largest periphery of the disc member 1 to the outermost portion of the face of the disc member. These relations of sizes between the members enables the disc member 1 to be snapped within the socket member 10 to detachably interlock these members together. This socket member 10 is also attached to sheet material 14, which is similar to the material 4. The attaching means for the socket member likewise comprises a hollow stem rivet 15 which is provided with a flat head 16 from which extends a hollow stem 17 that has a rolled over end 18 which secures the socket member 10 to the material 14. It will be observed that the stem 17 and the rolled over end 18 of the hollow rivet 15 is substantially smaller than the stem 7 and the rolled over end 8 on the hollow rivet 5. As a matter of fact, the rolled over end 18 is small enough to extend into the opening 9 in the rivet 5. It is unimportant whether the rivet 5 or the rivet 15 is the larger, as long as one rivet is large enough to permit the end of the smaller rivet to telescope within the larger rivet. This permits a close fit between the disc member 1 and the socket member 10, and is one feature of the present invention. It will be observed that the construction of the parts is such that when assembled, the thickness of the completed fastener is substantially less than the thickness of the stem type open socket commonly used as a snap fastener.

Figure 6:
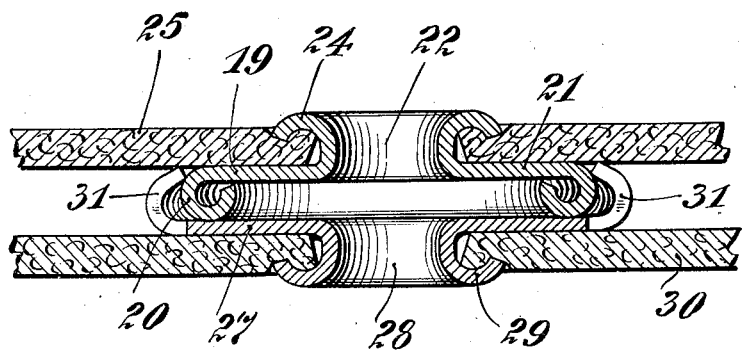
Fig. 6 is a section through a slight modification of the invention wherein the attaching rivets or eyelets for the disc member and the socket member are integral with the disc and with the socket members.

Fig. 6 illustrates a slight modification of the present invention and wherein the rivets for holding the disc member and the socket member in sheet material are formed integral with the members. This modified construction comprises a disc 19 having a rolled edge 20 and a back plate 21 from which extends a hollow rivet 22. This hollow rivet 22 has a rolled over end 24 which clamps the back plate 21 tightly against sheet material 25. Likewise, the socket member has a back plate 27 from which extends a hollow rivet 28 that has a rolled over end 29 that clamps the back plate 27 against sheet material 30. The back plate 27 carries upstanding fingers 31 that engage the rolled over edge 20 on the disc 19 to snap the fastener members together. The rivet 22 is integral with the disc 19 and the rivet 28 is integral with the socket plate 27.

Figure 7:
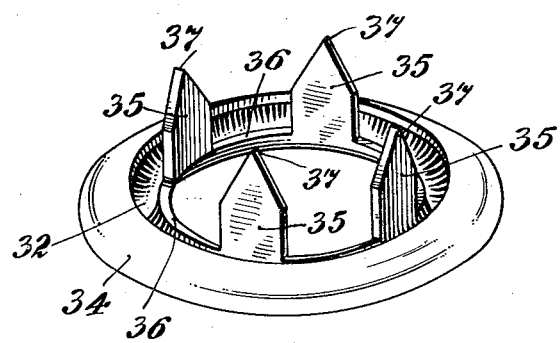
Fig. 7 is a perspective view of a slightly modified disc member, provided with locking tabs.
Figure 8:
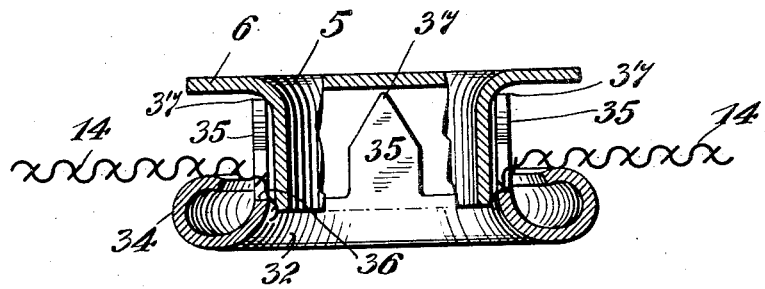
Fig. 8 is a sectional view showing the disc member illustrated in Fig. 7 and the hollow stem rivet telescoped prior to final setting.
Figure 9:
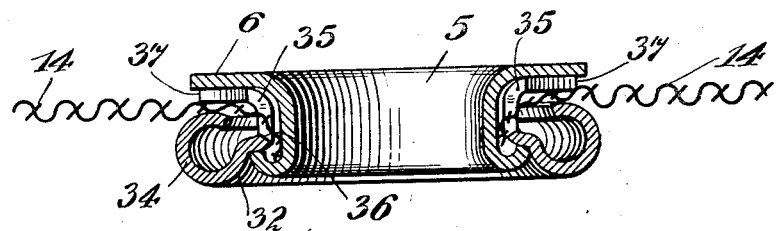
Fig. 9 is a sectional view showing the parts shown in Fig. 8 set in final form in sheet material.

Referring more especially to Figs. 7, 8, and 9, which illustrate a further modification of the present invention, the disc member 32 is provided with a rolled edge 34 and a plurality of integral tabs 35 extending from the inner edge 36. These tabs have pointed ends 37. The tabs 36 have several functions, some of which will be pointed out and others will be obvious. It is desirable that the open portion of the rolled edge 34 shall face the sheet material 14, and, therefore, since devices of this character are set by automatically fed setting machines, it is desirable that the discs shall be fed to the work station of the machine with the open portion of the rolled edge 34 positioned so as to rest against the sheet material 14 when the disc member is set in place. It is difficult to feed flat members, such as the discs 1, so that this condition will automatically occur. With the upstanding tabs 35 extending from one side of the disc member 32, these tabs may be used with the setting machine feed as one of the selecting members which will insure the proper positioning of the disc member for the setting operation. It will also be observed that the tabs 35 clinch the sheet material 14 more securely to the disc member 32. It will be observed in the cross-section illustrated in Fig. 9 that the tabs depress the sheet material 14 into the space beneath the head 6 of the hollow rivet 5 into the space between the rolled edge 34 and the stem of the hollow rivet. This adds an extra anchorage for the sheet material 14.

The present invention comprises a simple fastener which is economical to manufacture and is an efficient substitute for buttons or other thin fasteners where such fasteners are desired. There is also the further advantage in that since the present snap fastener is a thin flat structure, it feeds through laundry machinery like a button. The disc is incompressible in a roll wringer, and the socket will compress only to the extent that is necessary to bring the edges of the ends of adjacent fingers into contact. In practice, the space between fingers is small and the bringing of the edges together in no way interferes with the proper working of the fastener.

Having described my invention, I claim:

1. A flat snap fastener comprising a disc member having a rounded outer edge, a cupped socket member having a flat back plate, spring fingers extending inwardly from said back plate, the diametrical distance between the ends of said spring fingers being slightly less than the diameter of the largest periphery of the rounded outer edge of the disc member, hollow rivets securing the disc member and the socket member flatly against sheet material, said hollow rivets having flat heads and deformed inner ends to secure the members to sheets of sheet material, one of said hollow rivets being larger than the other to permit the end of the smaller rivet to pass within the end of the larger rivet without contacting the larger rivet.

2. A flat snap fastener comprising a disc member having a round rolled edge, a cupped socket member having a flat back plate, spring fingers extending inwardly from said back plate, the diametrical distance between the ends of said spring fingers being slightly less than the diameter of the largest periphery of the rounded rolled edge of the disc member, the height of the ends of said spring fingers above the flat back plate being less than the thickness of the rolled edge on the disc member, the disc member and the socket member being constructed and arranged to telescope with the roller edge of the disc member resting against the back plate of the socket member when the members are telescoped, means to secure the disc member to seet material, and means to secure the back plate of the socket member flatly against another piece of sheet material.

HENRY V. RAU.

CERTIFICATE OF CORRECTION.

Patent No. 2,170,216. August 22, 1939.

HENRY V. RAU.

It is hereby certified that error appears in the printed specification of the above numbered patent requiring correction as follows: Page 2, second column, line 41, claim 2, for the word "roller" read rolled; line 44, same claim, for "seet" read sheet; and that the said Letters Patent should be read with this correction therein that the same may conform to the record of the case in the Patent Office.

Signed and sealed this 26th day of September, A. D. 1939.

(Seal)
Henry Van Arsdale,
Acting Commissioner of Patents.